Patented Mar. 1, 1949

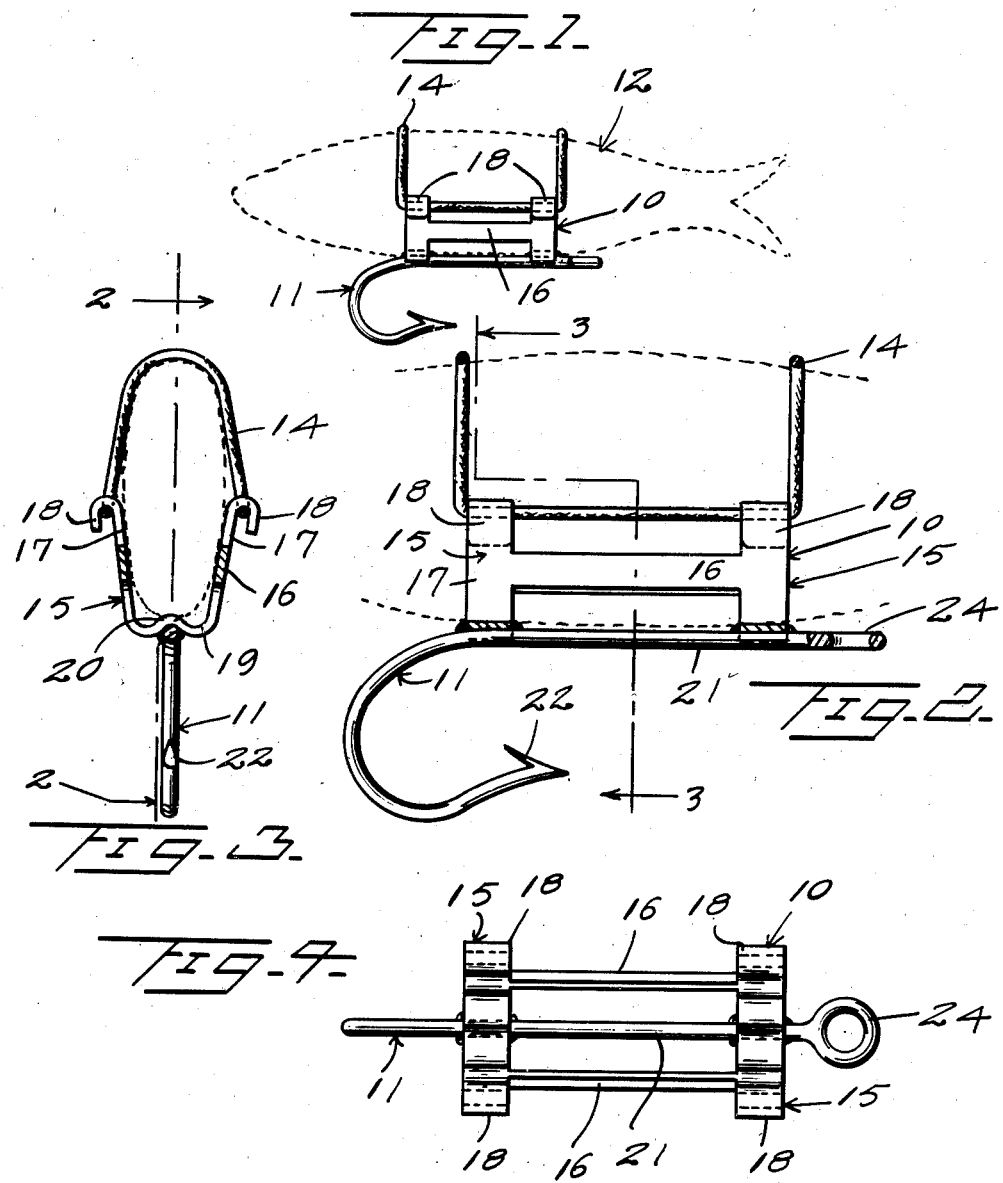

2,463,369

UNITED STATES PATENT OFFICE 2,463,369

LIVE BAIT CRADLE

Thomas B. Finlay, Coral Gables, Fla., and Samuel A. Laneri, South Glastonbury, Conn.; said Finlay assignor to Anthony Senatro, South Glastonbury, Conn.

Application February 19, 1947, Serial No. 729,496

3 Claims. (Cl. 43—40)

This invention relates to bait holders and more particularly to a cradle for attachment to live bait for securing a hook to the bait.

It is an object of this invention to provide an improved bait holder of the kind to be more specially described hereinafter, which is formed of a cradle having a hook fixed thereon, the cradle being so constructed and arranged that it may be securely fastened to the minnow or other live bait in such a manner that the hook will extend away from the bait and not pentrate into the body of the minnow as is the present custom. In this manner the bait will remain alive and relatively free to swim in its normal manner. As the hook is free of the bait, there will be no obstruction to the hook when taken by the game fish.

Another object of this invention is to provide a live bait cradle of this kind which is extremely light to permit a relatively free movement of the bait and strong enough to securely hold the bait to the line.

Still another object of this invention is to provide a live bait cradle which may be attached to the minnow or other live bait by means of a rubber band, string or other flexible means, which will engage in the fastening hooks on opposite sides of the cradle and pass over the back of the bait for securely holding the bait in the cradle. In this manner the cradle may be readily secured to the minnow without piercing it, whereby the bait will remain alive and free to move in the water.

A further object of this invention is to provide a live bait cradle of this kind which is very simple in construction, whereby it may be readily manufactured and fabricated at an economical cost and which may, when completed, be readily secured onto a minnow or other live bait with a minimum amount of labor and which will be securely fastened about the bait.

With the above and other objects in view, our invention consists in the arrangement, combination and details of construction disclosed in the drawings and specification, and then more particularly pointed out in the appended claims.

In the drawings,

Figure 1 is a side elevation of a live bait cradle constructed according to an embodiment of this invention, Figure 2 is a longitudinal section taken on the line 2—2 of Figure 3, Figure 3 is a transverse section taken on the line 3—3 of Figure 2, Figure 4 is a top plan view.

Referring to the drawing, the numeral 10 designates generally a live bait cradle for securing a minnow or other types of fish used for live bait onto the end of a line. The live bait cradle 10 is constructed so that the hook 11 will extend away from the bait so that the hook will be free and the minnow or other form of live bait will remain alive for an extended period of time.

The cradle 10 is so constructed and arranged that it may be quickly fastened to the body of a minnow 12 for which the cradle is especially designed, and will be secured thereon by a rubber band or other flexible resilient material 14, which engages over the top of the minnow's body and engages in hooks on the sides of the cradle 10. The cradle 10 is formed with a pair of longitudinally spaced apart U-shaped members 15 which are fixed together by longitudinally extending connecting bars 16 formed on or fixed to the upwardly extending side arms 17 of each of the members 15.

Outwardly directed and downwardly opening hooks 18 are formed on the upper end of each of the arms 17 to provide hooks for securing the rubber band 14. The bight 19 of each of the U-shaped members 15 is formed with a downwardly opening concave detent 20 midway the length thereof, in which the shank 21 of the hook 11 is adapted to be engaged, where it will be soldered or otherwise fixed between the members 15.

The hook 11 is formed with a rearwardly direct reverted bar 22 on the rear end thereof. A fastening eye 24 is fixed to or formed on the forward end of the shank 21 and extends forwardly of the cradle 10. The fishing line is adapted to be secured to the cradle 10 by engaging in the eye 24.

In the use of this cradle 10, the body of the minnow or other bait 12 is adapted to be slid between the arms 15 and a rubber band as 14 may be engaged in the hooks 18 on one side of the body and pulled over the top of the fish for engagement in the hooks 18 on the opposite side of the cradle 10.

We do not mean to confine ourselves to the exact details of construction herein disclosed, but claim all variations falling within the purview of the appended claims.

What we claim is:

1. A live bait holder comprising a U-shaped cradle adapted to receive live bait, said cradle including a pair of longitudinally spaced apart U-shaped members, longitudinally extending connecting bars connecting said members together, a hook including a shank and a reverted barb, said shank fixed to said U-shaped members, the barb extending below the bight of said members, reverted fastening hooks on the upper ends of the arms of said members, and flexible means engageable about the bait and in said fastening hooks for holding live bait in said cradle.

2. A live bait holder comprising longitudinally spaced apart U-shaped cradle forming members adapted to receive live bait, longitudinally extending connecting bars fixed to the arms of said members connecting said members together, outwardly extending downwardly opening fastening hooks on the upper ends of the arms of said members, a hook fixed to said cradle, and flexible fastening means engageable over the bait and in said fastening hooks for securing the bait in the cradle.

3. A live bait holder comprising a pair of U-shaped cradle forming members adapted to receive live bait, connecting bars between said members securing said members in longitudinally spaced apart relation, an outwardly extending hook on said cradle, downwardly opening fastening hooks on said members, and resilient means engageable over the bait and in said fastening hooks for holding the bait in the cradle.

THOMAS B. FINLAY.
SAMUEL A. LANERI.

REFERENCES CITED

The following references are of record in the file of this patent:

UNITED STATES PATENTS

| Number | Name | Date |
|---|---|---|
| 1,338,877 | Smith | May 4, 1920 |

FOREIGN PATENTS

| Number | Country | Date |
|---|---|---|
| 149 221 | Germany | Mar. 5, 1904 |